(12) United States Patent
Pinel et al.

(10) Patent No.: US 9,665,828 B2
(45) Date of Patent: May 30, 2017

(54) USING PHYSICOCHEMICAL CORRELATES OF PERCEPTUAL FLAVOR SIMILARITY TO ENHANCE, BALANCE AND SUBSTITUTE FLAVORS

(71) Applicant: International Business Machines Corporation, Armonk, NY (US)

(72) Inventors: Florian Pinel, New York, NY (US); Nan Shao, Ridgefield, CT (US); Lav R. Varshney, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 14/458,315

(22) Filed: Aug. 13, 2014

(65) Prior Publication Data

US 2015/0199608 A1    Jul. 16, 2015

Related U.S. Application Data (60) Provisional application No. 61/928,092, filed on Jan. 16, 2014.

(51) Int. Cl.
| | |
|---|---|
| G06N 7/00 | (2006.01) |
| G06Q 10/06 | (2012.01) |
| G06K 9/00 | (2006.01) |

(52) U.S. Cl.
CPC ......... G06N 7/005 (2013.01); G06K 9/00496 (2013.01); G06Q 10/067 (2013.01)

(58) Field of Classification Search
None
See application file for complete search history.

(56) References Cited

U.S. PATENT DOCUMENTS

| | | | |
|---|---|---|---|
| 4,165,391 A | 8/1979 | Corbett nee Rolison |
| 5,303,846 A | 4/1994 | Shannon |
| | (Continued) | |

FOREIGN PATENT DOCUMENTS

| | | |
|---|---|---|
| CN | 101603959 A | 12/2009 |
| CN | 102331476 A | 1/2012 |
| | (Continued) | |

OTHER PUBLICATIONS

Ahn et al., "Flavor network and the principles of food pairing," Scientific Reports, Dec. 15, 2011, p. 1-7, 1 : 196.

(Continued)

*Primary Examiner* — Alan Chen
(74) *Attorney, Agent, or Firm* — David Zwick (57) ABSTRACT

Receiving, by a computer, data identifying one or more flavor compounds and their respective quantities in a food and an enhancement objective. Identifying one or more flavor compounds associated with a distinct flavor of the food. Creating a vector of physicochemical properties associated with the one or more flavor compounds associated with the distinct flavor of the food. Creating a vector of physicochemical properties associated with each of one or more additive flavor compounds. Identifying an additive flavor compound to enhance the food based on the angle between the physicochemical property vector associated with the distinct flavor of the food and the physicochemical property vectors for the one or more additive flavor compounds, and the enhancement objective.

20 Claims, 5 Drawing Sheets

(56) References Cited

U.S. PATENT DOCUMENTS

| | | | |
|---|---|---|---|
| 5,783,544 | A | 7/1998 | Trinh et al. |
| 6,077,318 | A | 6/2000 | Trinh et al. |
| 6,248,135 | B1 | 6/2001 | Trinh et al. |
| 6,978,243 | B2 | 12/2005 | Godinot et al. |
| 7,222,634 | B2 | 5/2007 | Hess et al. |
| 2005/0048186 | A1 | 3/2005 | Lehmberg et al. |
| 2008/0201690 | A1 | 8/2008 | Lovisa et al. |
| 2009/0311403 | A1 | 12/2009 | Grab |
| 2011/0123674 | A1 | 5/2011 | Wolfschoon et al. |
| 2011/0131047 | A1 | 6/2011 | Geiser et al. |
| 2011/0271187 | A1 | 11/2011 | Sullivan et al. |
| 2013/0224695 | A1 | 8/2013 | Wolfe et al. |
| 2016/0262437 | A1* | 9/2016 | Varshney ........... G01N 33/0001 |

FOREIGN PATENT DOCUMENTS

| | | |
|---|---|---|
| CN | 103198296 A | 7/2013 |
| EP | 1571579 A1 | 9/2005 |
| EP | 1389047 B1 | 7/2009 |
| WO | 0004464 A1 | 1/2000 |
| WO | 2011005157 A1 | 1/2011 |

OTHER PUBLICATIONS

Burdock, "Fenaroli's handbook of flavor ingredients," Preface, Introduction, and Glossary only, 2010, 6th Edition, Taylor and Francis Group, LLC.

Fisk et al., "Discrimination of roast and ground coffee aroma," Flavour Journal, 2012, p. 1-9, 1:14, BioMed Central Ltd.

Kessler, "Steganography: Hiding Data Within Data," Sep. 2001, p. 1-5, http://www.garykessler.net/library/steganography.html, Accessed on Aug. 5, 2014.

Khan et al., "Predicting Odor Pleasantness from Odorant Structure: Pleasantness as a Reflection of the Physical World," The Journal of Neuroscience, Sep. 12, 2007, p. 10015-10023, 27(37), Society for Neuroscience.

Koulakov et al., "In search of the structure of human olfactory space," Frontiers in Systems Neuroscience, Sep. 15, 2011, p. 1-8, vol. 5, Article 65.

Liddell et al., "Frozen Desserts: The Definitive Guide to Making Ice Creams, Ices, Sorbets, Gelati, and Other Frozen Delights," Preface and Introduction only, 1996, St. Martin's Griffin.

Lim, "Blame the Caveman for Your Love of Junk Food," Huffpost Living Canada, Posted: Jun. 12, 2012, p. 1, http://www.huffingtonpost.ca/juyun-lim/science-of-flavour_b_1589633.html, Accessed on Aug. 5, 2014.

Mizukoshi, "Model Studies of Cake Baking. VI. Effects of Cake Ingredients and Cake Formula on Shear Modulus of Cake," Cereal Chemistry, 1985, p. 247-251, vol. 62, No. 4, American Association of Cereal Chemists, Inc.

Morris et al., "Soup Over Bean of Pure Joy: Culinary Ruminations of an Artificial Chef," International Conference on Computational Creativity, 2012, p. 119-125.

Pinel et al, "Automated Generation of New Work Products and Work Plans," filed on Mar. 19, 2013, p. 1-37, U.S. Appl. No. 13/847,099.

Pinel et al., "Computational Creativity for Culinary Recipes," CHI 2014, Apr. 26-May 1, 2014, p. 439-442, One of a CHInd, ACM, Toronto, ON, Canada.

Pinel et al, "Computational Creativity Process for Generating Novel Work Products," filed on Jan. 16, 2014, p. 1-80, U.S. Appl. No. 61/928,092.

Severson, "Picky Eaters? They Get It From You," New York Times, Oct. 10, 2007, p. 1-4, http://www.nytimes.com/2007/10/10/dining/10pick.html?_r=1&pagewan&, Accessed on Aug. 5, 2014.

Shao et al., "New Developments in Culinary Computational Creativity," IBM TJ Watson Research Center, 2014, Presented at the Fifth International Conference on Computational Creativity Jun. 9-13, 2014.

Shepherd, "Smell images and the flavour system in the human brain," Insight Review Nature, Nov. 16, 2006, p. 316-321, vol. 444, Nature Publishing Group.

Snitz et al., "Predicting Odor Perceptual Similarity from Odor Structure," PLOS Computational Biology, Sep. 2013, p. 1-12, vol. 9, Issue 9.

Teng et al., "Recipe recommendation using ingredient networks," WebSci 2012, Jun. 22-24, 2012, ACM.

Varshney et al., "A Big Data Approach to Computational Creativity," IBM Thomas J. Watson Research Center, 2014, Presented at IEEE, the Workshop on Information in Networks, and ACM.

Varshney et al., "Food Steganography," filed on Aug. 27, 2013, p. 1-29, U.S. Appl. No. 14/011,421.

Varshney et al., "Food Steganography," filed on Oct. 22, 2013, p. 1-28, U.S. Appl. No. 14/059,931.

Weiss et al., "Perceptual convergence of multi-component mixtures in olfaction implies an olfactory white," PNAS Early Edition, Oct. 19, 2012, p. 1-6.

Young, "Making Sense of Scents," Bow Hunting World, May 25, 2011, p. 1-2, http://www.grandviewoutdoors.com/articles/print/making-sense-of-scents, Accessed on Aug. 5, 2014.

* cited by examiner

USING PHYSICOCHEMICAL CORRELATES OF PERCEPTUAL FLAVOR SIMILARITY TO ENHANCE, BALANCE AND SUBSTITUTE FLAVORS

CROSS-REFERENCE TO RELATED APPLICATION

This application claims priority to U.S. Provisional Patent Application Ser. No. 61/928,092, filed Jan. 16, 2014, the disclosure of which is hereby incorporated by reference in its entirety.

BACKGROUND

The present disclosure relates generally to knowledge processing systems and more particularly to using physicochemical correlates of perceptual flavor similarity to enhance, balance, and substitute flavors.

Human flavor perception is very complicated, involving a variety of external sensory stimuli and internal states. Taste typically refers to the five basic receptors: sweet, salty, sour, bitter, and umami. Flavor, on the other hand, is a combination of taste plus other sensations such as aroma, texture, juiciness, mouthfeel, and color that influence our perception through the emotional, memory-related, motivational, and linguistic aspects of food.

The aroma, or odor, of foods may be a key contributor to flavor perception. Natural odors are a mixture of many molecules and the aroma of food may result from the properties of the chemical compounds found in the ingredients included in the food. There may typically be tens to hundreds of different chemical compounds affecting the aroma of each food ingredient.

SUMMARY

Embodiments of the present invention disclose a method, computer program product, and system for receiving, by a computer, data identifying one or more flavor compounds and their respective quantities in a food and an enhancement objective, identifying, by the computer, one or more flavor compounds associated with a distinct flavor of the food, creating, by the computer, a vector of physicochemical properties associated with the one or more flavor compounds associated with the distinct flavor of the food, creating, by the computer, a vector of physicochemical properties associated with each of one or more additive flavor compounds, and identifying, by the computer, an additive flavor compound to enhance the food based on the angle between the physicochemical property vector associated with the distinct flavor of the food and the physicochemical property vectors for the one or more additive flavor compounds, and the enhancement objective.

BRIEF DESCRIPTION OF THE SEVERAL VIEWS OF THE DRAWINGS

Features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Perceptual odor similarity may be determined by a computation framework and algorithm that looks at molecular structure. For example, "Predicting Odor Perceptual Similarity from Odor Structure" by Snitz et al., published Sep. 12, 2013, describes a model that predicts odorant mixture perceptual similarity from odorant mixture structure. Each odorant mixture is represented as a vector in which each vector component represents one of the plurality of mono-molecules in the odorant mixture and in which the vector component is comprised of the sum of the structural and physicochemical descriptors of its mono-molecule. The angle, or "distance", between two normalized odorant mixture vectors was found to be a meaningful predictor of the perceptual similarity of the two odorant mixtures. The distance model resulted in consistent comparisons of identical mixtures and a correlation between two similar odors that was strong.

The angle between two odorant vectors may be represented by the following equation:

$$\theta(\vec{U}, \vec{V}) = \arccos\left(\frac{\vec{U} \cdot \vec{V}}{|\vec{U}||\vec{V}|}\right) \quad (1)$$

in which U and V are odorant mixture vectors, U·V is the dot product between the vectors, and $|U|,|V|$ are the norms of the vectors. The angle distance between the two odorants' mixture vectors, U and V, may predict the perceptual similarity of the two odorant mixtures. The smaller the angle distance, the more similar the odor perception for the two odorant mixtures.

Since odor plays a key role in flavor, perceptual flavor similarity, like perceptual odor similarity, may be determined using a data driven, angle distance model. The resulting quantitative measure of perceptual similarity or dissimilarity of flavors may then be used to enhance, balance and emulate flavors. For example, a food's flavor may be enhanced by adding ingredients with perceptually similar flavors, balanced by adding ingredients with perceptually opposite flavors, and unchanged by substituting ingredients with perceptually similar flavors.

A food's flavor may result from a mixture of one or more ingredients, or flavor compounds. Each flavor compound may be represented as a physicochemical descriptor vector whose components include structural and physicochemical descriptors, such as heavy atom count, complexity, rotatable bond count, hydrogen bond acceptor count, etc.

The food mixture's overall flavor, may be represented as a vector in which each vector component represents one of the plurality of flavor compounds found in the respective food's ingredients and in which the vector component is comprised of the sum of the structural and physicochemical descriptors of its flavor compound. Like perceptual odor similarity described above, the angle distance model between two normalized food mixture vectors may determine perceptual flavor similarity.

Quantitatively identifying perceptual flavor similarity of foods, food ingredients, and food additives may simplify food flavor enhancement, food flavor balance, and food flavor substitution. Food preparation, whether in the home, restaurant, or factory may advantageously utilize perceptual flavor similarity of flavor compounds to modify food recipes for flavor enhancement, cost reduction, allergy remediation, culinary preference, such as vegetarian, etc., without perceptually changing the flavor of the food. Healthy, but objectionably flavored ingredients in a food, may be balanced with ingredients identified as perceptual flavor opposites of the objectionable ingredients.

Various embodiments of the present disclosure may determine the physicochemical descriptors of the flavor compounds included in a food and optimize, using those physicochemical descriptors, the selection of a flavor compound, from among a plurality of flavor compounds, which best meets the perceptual flavor similarity objectives of enhancement, balance, or emulation for that food.

Various embodiments may also optimize, using those physicochemical descriptors, the creation of a flavor compound mixture which best meets the perceptual flavor similarity objectives of enhancement, balance, or emulation for that food.

Figure 1:
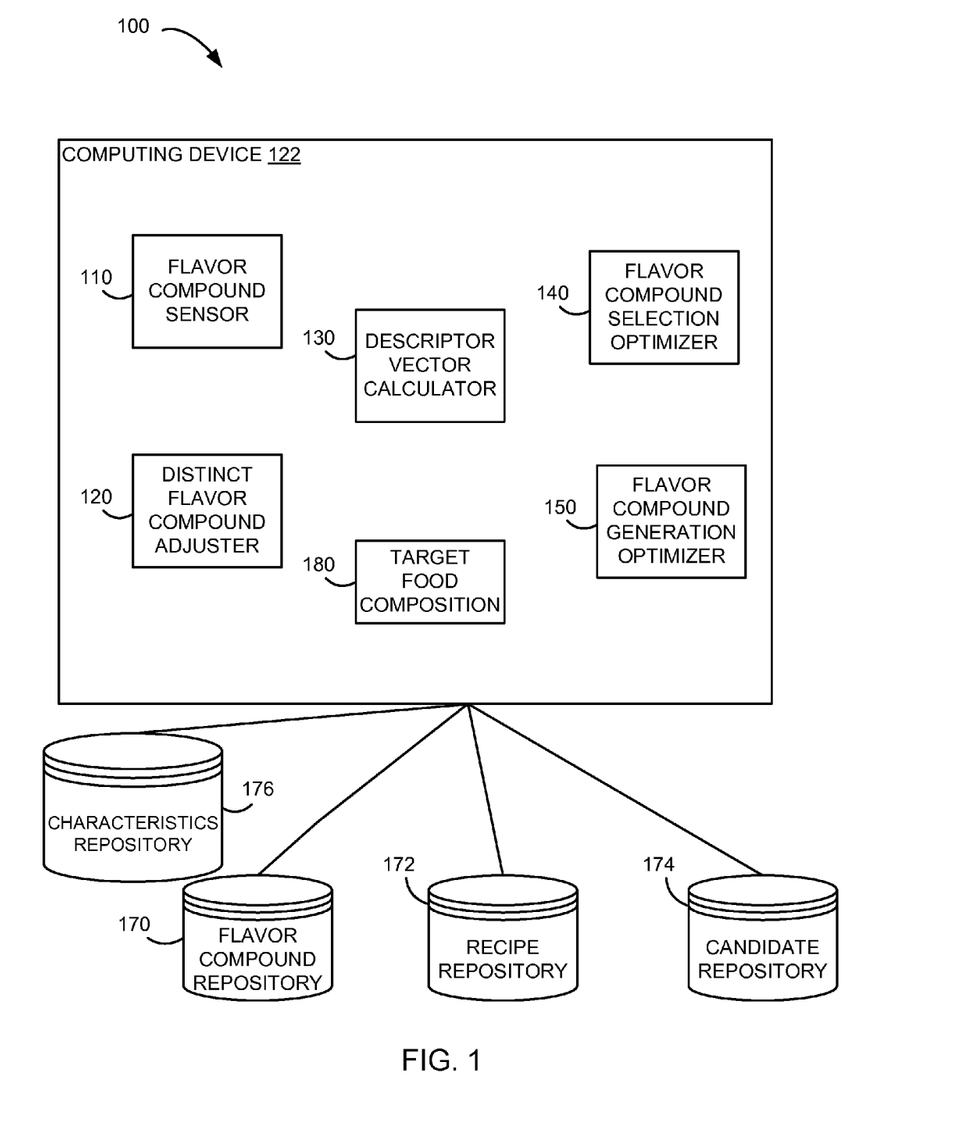
FIG. 1 illustrates a functional block diagram of an exemplary perceptual flavor system, in accordance with an embodiment of the present disclosure.

FIG. 1 illustrates a functional block diagram of an exemplary perceptual flavor system 100 in which a computing device 122 is configured, in accordance with an embodiment of the present invention. Perceptual flavor system 100 may, in various embodiments, determine a food or flavor additive to add to a target food, which is itself a combination of one or more ingredients, to either enhance the flavor of the target food, balance the flavor of the target food, or emulate the flavor of the target food. Various embodiments may select an optimum food or flavor additive from among a plurality of candidate food/flavor additives. In other embodiments, perceptual flavor system 100 may create an optimum flavor additive from a combination of one or more flavor compounds.

In various embodiments, a target food to be perceptually flavor adjusted and an enhancement objective may be received by the perceptual flavor system 100. The enhancement objective may include perceptual flavor adjustment objectives including enhancement, balance, and emulation, and optimization adjustment objectives for the perceptual flavor adjustment, including, but not limited to, cost of ingredients and production, and dietary requirements. Computing device 122 may include a flavor compound sensor 110, a distinct flavor compound adjuster 120, a descriptor vector calculator 130, a flavor compound selection optimizer 140, a flavor compound generation optimizer 150, a flavor compound repository 170, a recipe repository 172, a flavor compound additive candidate repository 174, a flavor compound characteristics repository 176, and a target food composition 180, all of which may be stored, for example, on a computer readable storage medium, such as computer readable storage medium (media) 530 (FIG. 5), portable computer readable storage medium (media) 570, and/or RAM(S) 522. The flavor compound repository 170, recipe repository 172, flavor compound additive candidate repository 174, and flavor compound characteristics repository 176 may reside within the perceptual flavor system 100 or may be externally accessed through a network (for example, the Internet, a local area network or other, wide area network or wireless network) and network adapter or interface 536. The network may comprise copper wires, optical fibers, wireless transmission, routers, firewalls, switches, gateway computers, and/or edge servers.

In certain embodiments in which the target food is received as a named food, such as spaghetti sauce, computing device 122 may locate the target food's recipe in recipe repository 172. Recipe repository 172 may be a local repository or may be a private or public repository searchable over a private or public network. Recipe repository 172 may include a list of ingredients (flavor compounds) and ingredient quantities included in the target food. For a target food whose recipe is found in recipe repository 172, the included ingredients' structural and physicochemical descriptors may be found in flavor compound repository 170 and the included ingredients' flavor characteristics may be found in flavor compound characteristics repository 176, described in further detail below.

Flavor compound repository 170 may include the structural and physicochemical descriptors of a plurality of food ingredients. Flavor compound repository 170 may be a repository resulting from the scientific study of food ingredients. Flavor compound repository 170 may be a local repository, a private repository, or public repository modelled after, for example, the Database Referencing of Array Genes Online (DRAGON), searchable over a private or public network.

Flavor compound characteristics repository 176 may include characteristic data for each flavor compound found in flavor compound repository 170, including but not limited to, flavor compound intensity values, flavor compound availability values, cost values, nutritional values, allergy inducing values, and calorie values. Flavor compound characteristics repository 176 may be a local repository or may be a private or public repository, searchable over a private or public network.

In embodiments in which the target food is received as a food sample, flavor compound sensor 110 may analyze the target food. Flavor compound sensor 110 may, in various embodiments, use an electronic nose that may include one or more of a metal-oxide-semiconductor, conducting polymer, mass spectrometry or ultra-fast gas chromatography detection system, to analyze the target food and identify individual flavor compounds that make up the target food. Flavor compound sensor 110 may combine the responses of all of its sensors and provide results that can be interpreted as a list and quantity of the flavor compounds whose structural and physicochemical descriptors may be found in flavor compound repository 170 and whose flavor characteristics may be found in flavor compound characteristics repository 176. Flavor compound sensor 110 may, in certain embodiments, analyze and provide results on individual flavor compound intensities in the target food. For example, flavor compound sensor may compare each flavor compound's response against the average response of all the identified flavor compounds in the target food and assign an intensity value based on that comparison.

After the individual flavor compounds in the target food are identified by flavor compound sensor 110 or recipe repository 172 search, distinct flavor compound adjuster 120 may create a target food composition 180 for the target food. The target food composition 180 may include each flavor compound identified in the target food. In certain embodiments, target food composition 180 may include a quantity value for each of the flavor compounds in the target food. The quantity value may be a unit measurement value representing the number of units, for example grams or teaspoons, of the flavor compound in the target food, or may be a relative value representing the ratio of the quantity of a particular flavor compound to the quantity of all flavor compounds in the target food. In certain embodiments, target food composition 180 may also include the intensity value for the flavor compounds, the cost value for the flavor compounds, and other values found in flavor compound characteristics repository 176, for each flavor compound in target food composition 180. Target food composition 180 may be stored on computer readable storage media 530, 570 or in computer memory as a set of vectors, a linked list, an array, a table, etc. In various embodiments, target food composition 180 may be defined as a table with rows for all possible flavor compounds found in flavor compound repository 170. Target food composition 180 may alternately be defined as a set of vectors or arrays with each vector including a vector component and each array including an array element for all possible flavor compounds found in flavor compound repository 170. Any table row, vector component, array element, etc., in target food composition 180 set aside for flavor compounds not found in the target food may be set to zero.

Distinct flavor compound adjuster 120 may, in various embodiments, eliminate certain flavor compounds from target food composition 180 leaving only distinct flavor compounds that may distinguish the target food from other foods. Distinct flavor compound adjuster 120 may eliminate flavor compounds that exist widely in other foods, such as water, that do not help to distinguish the target food from other foods. A flavor compound may be considered distinct, for example, based on the frequency in which it appears in the recipe repository 172. A frequency threshold, used by distinct flavor compound adjuster 120 to determine a distinct flavor compound, may be pre-set or configurable.

In certain embodiments, distinct flavor compound adjuster 120 may eliminate flavor compounds by replacing their values in target food composition 180 with zeros. Distinct flavor compound adjuster 120 may, then, create a normalized physicochemical descriptor vector for each distinct flavor compound in target food composition 180 and associate each created vector with its flavor compound in target food composition 180.

Figure 2:
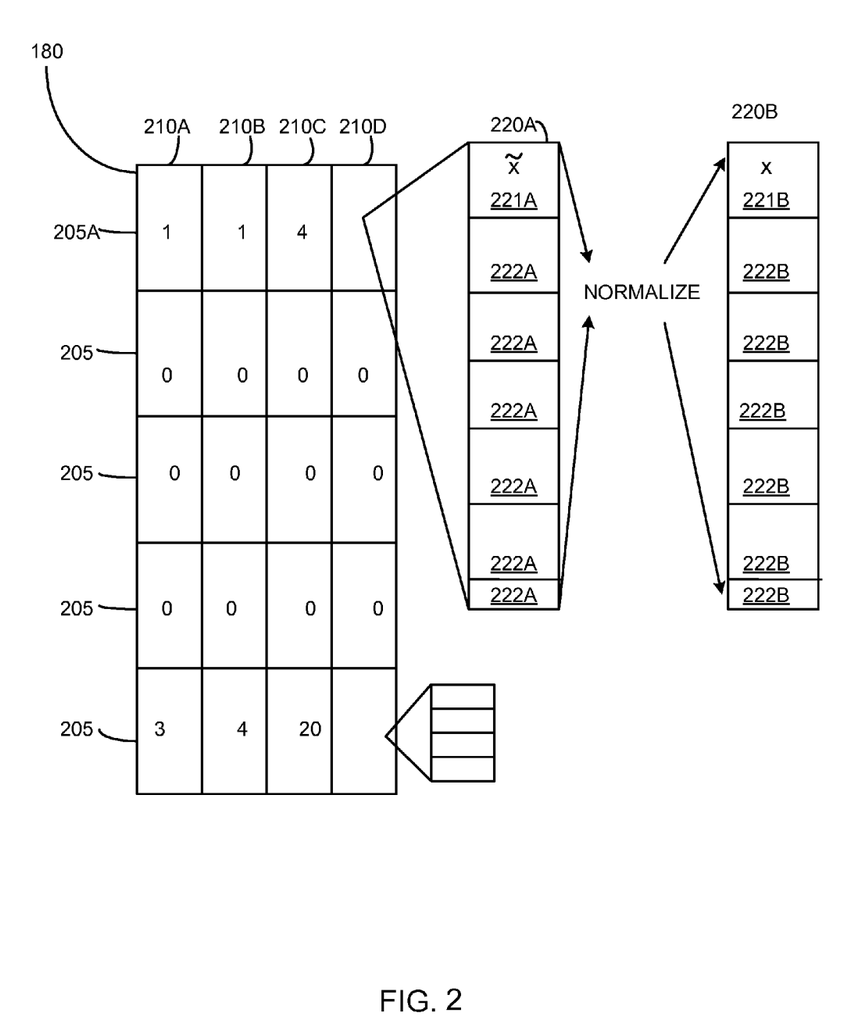
FIG. 2 depicts an exemplary target food composition and normalized physicochemical descriptor vector, in accordance with an embodiment of the disclosure.

FIG. 2 depicts an exemplary target food composition 180 and normalized physicochemical descriptor vector 220B, in accordance with an embodiment of the disclosure. Exemplary target food composition 180 is depicted as a table with rows 205 and 205A, each row representing one of the plurality of flavor compounds in flavor compound repository 170. Each non-zero row may represent a distinct flavor compound in the target food. Columns 210A, 210B, and 210C represent data characteristics for each distinct flavor compound. Column 210A represents, for example, quantity values of the distinct flavor compounds in the target food; column 210B represents, for example, flavor intensity values of the distinct flavor compounds; and column 210C represents, for example, costs of the distinct flavor compounds. Column 210D may represent the physicochemical descriptors for the distinct flavor compounds, as found in flavor compound repository 170. Various embodiments may include additional columns to include values for additional flavor compound characteristics, such as nutritional values, allergy inducing values, calorie values, etc. Distinct flavor compound adjuster 120 may, in various embodiments, decide which of the physicochemical descriptors that define the flavor compounds from exemplary column 210D to utilize when creating a physicochemical description vector 220A for the flavor compounds. Certain embodiments may utilize all physicochemical descriptors for the flavor compound included from flavor compound repository 170, while other embodiments may select to utilize a subset of the physicochemical descriptors. Distinct flavor compound adjuster 120 may create the physicochemical descriptor vectors 220A, for each flavor compound in the target food, utilizing the same set of selected physicochemical descriptors.

Distinct flavor compound adjuster 120 may copy the selected physicochemical descriptors from exemplary column 210D for flavor compound in row 205A into exemplary vector 220A. Exemplary vector 220A may include a component, 221A, 222A, for each selected physicochemical descriptor for the flavor compound. Each physicochemical descriptor value in vector 220A may be normalized to a value in the range [0, 1] according to the following equation:

$$x = \frac{\tilde{x} - lb}{ub - lb} \quad (2)$$

where x represents the normalized descriptor value 221B, 222B of an exemplary physicochemical descriptor value $\tilde{x}$ 221A, 222A, and ub and lb represent the upper and lower bounds, respectively, of the physicochemical descriptor. Distinct flavor compound adjuster 120 may determine the upper and lower bounds of a physicochemical descriptor, such as heavy atom count, by analyzing all values for that physicochemical descriptor in flavor compound repository 170 to determine the maximum value (upper bound) and minimum value (lower bound) of that descriptor in all flavor compounds in the repository 170. Distinct flavor compound adjuster 120 may normalize each physicochemical descriptor component value in the physicochemical descriptor vector 220A, resulting in the exemplary normalized physicochemical descriptor vector 220B. Distinct flavor compound adjuster 120 may create a normalized physicochemical descriptor vector 220B for each distinct flavor compound in target food composition 180.

Returning to FIG. 1, descriptor vector calculator 130 may, in various embodiments, create a flavor compound quantity vector for the target food from the flavor compound quantity information stored in target food composition 180. The created flavor compound quantity vector may include a vector component for all possible flavor compounds found in flavor compound repository 170. Each vector component may include the quantity value, from target food composition 180, for the corresponding flavor compound in the target food. The quantity value, in a flavor compound quantity vector component, for a flavor compound not found in target food composition 180, may be set to zero. The dimension of every flavor compound quantity vector may be identical and determined by the number of flavor compounds in flavor compound repository 170. In various embodiments, descriptor vector calculator 130 may also create a flavor compound intensity vector from information stored in target food composition 180. The created flavor compound intensity vector may include a vector component for all possible flavor compounds found in flavor compound repository 170. Each vector component may include the intensity value, from target food composition 180, for the corresponding flavor compound in the target food. As with the flavor compound quantity vector, the intensity value, in a flavor compound intensity vector component, for a flavor compound not found in target food composition 180, may be set to zero. The dimension of every flavor compound intensity vector may be identical and determined by the number of flavor compounds in flavor compound repository 170.

In various embodiments, descriptor vector calculator 130 may create a physicochemical descriptor vector, or target food mixture descriptor vector, for the entire flavor compound mixture of the target food. The created target food mixture descriptor vector may include a vector component for all possible flavor compounds found in flavor compound repository 170. In various embodiments, the order of vector components corresponding to flavor compounds may be the same among the flavor compound quantity vector, the flavor compound intensity vector, and the target food mixture descriptor vector.

In certain embodiments, $\mathbb{R}_+^n$ represents the non-negative real space of flavor compound quantities where, for example, n is the number of available flavor compounds. Descriptor vector calculator 130 may utilize a function P to project from $\mathbb{R}_+^n$ to $\mathbb{R}_d$ where d<n, such that $\mathbb{R}^d$ is a normed physicochemical descriptor space of d dimensions. The following equation:

$$\vec{V} = P(v) = \frac{\sum_i v_i x_i}{\left\|\sum_i v_i x_i\right\|} \quad (3)$$

to create the target food mixture descriptor vector, V, representing the entire flavor compound mixture of the target food. In equation (3), $v \in \mathbb{R}_+^n$, is the flavor compound quantity vector, $v_i$ is the quantity value for the ith flavor compound in the target food, and $x_i$, $x_i \in \mathbb{R}^d$, is the normalized physicochemical descriptor vector component 221B, 222B, created by distinct flavor compound adjuster 120, for the ith flavor compound in the target food. Each vector component of the target food mixture descriptor vector, V, is set to be the sum of each normalized physicochemical descriptor vector component value for the corresponding flavor compound. In certain embodiments, descriptor vector calculator 130 may factor the quantity value for each flavor compound, from the flavor compound quantity vector, into the calculation of the target food mixture descriptor vector by multiplying each normalized physicochemical descriptor vector component value by the quantity value for that flavor compound. To eliminate the effect of the number of flavor compounds in the target food on the size of the target food mixture descriptor vector, the sum of the vectors 220B may be divided by its norm.

In certain embodiments, descriptor vector calculator 130 may factor the intensity value of each flavor compound, from the flavor compound intensity vector, into the calculation of the target food mixture descriptor vector, V, according to equation (4) below, where w is the flavor compound intensity vector and $w_i$ is the intensity value of the ith flavor compound in the target food.

$$\vec{V} = P(v) = \frac{\sum_i v_i w_i x_i}{\left\|\sum_i v_i w_i x_i\right\|} \quad (4)$$

After the target food mixture descriptor vector has been created, flavor compound selection optimizer 140 may, in various embodiments, utilize that vector to select an additive flavor compound from flavor compound additive candidate repository 174 to optimally adjust the target food. In various embodiments the additive flavor compound may be a food, a flavor additive, a mixture of one or more foods, a mixture of one or more flavor additives, or a mixture of one more foods with one or more flavor additives.

In various embodiments, flavor compound additive candidate repository 174, hereinafter "candidate repository", may include potential flavor compound lists in food ingredients and flavor compound lists in flavor additives. Candidate repository 174 may include all the flavor compounds found in flavor compound repository 170 or may, in various embodiments, be a selective subset of the flavor compounds found in flavor compound repository 170. The subset selected may be based on dietary requirements and preferences, including, but not limited to, gluten free flavor compounds, allergy avoidance flavor compounds, low-fat flavor compounds, and vegan flavor compounds. The candidate repository 174 may also include combinations of flavor compounds from flavor compound repository 170, and flavor compound mixtures created by perceptual flavor system 100, described in more detail below, which may not be included in flavor compound repository 170.

Before a target food can be enhanced, balanced, or flavor compounds substituted, the flavor compound sensor 110 or flavor compound repository 170, in conjunction with distinct flavor compound adjuster 120 and descriptor vector calculator 130 may, in various embodiments, execute as described above to create candidate descriptor vectors, A, for each candidate food/flavor additive in candidate repository 174.

In various embodiments, the angle distance model, previously described, may be used by flavor compound selection optimizer 140 to identify one or more candidate food/flavor additives capable of adjusting the flavor of the target food. Flavor compound selection optimizer may attempt to calculate an optimal candidate food/flavor additive over the flavor compound space. This attempt may lead to an unbounded solution set (an essentially infinite number of solutions). In various embodiments, flavor compound selection optimizer 140 may calculate at least one optimal solution that identifies a candidate food/flavor additive, or combination of candidate food/flavor additives, from among the candidates and candidate combinations in candidate repository 174, to adjust the received target food in accordance with the requested type of adjustment (e.g., enhance, balance, emulate) and in accordance with the requested optimization adjustment objective (e.g., low cost). Flavor compound selection optimizer 140 may determine an optimum candidate food/flavor additive and, in various embodiments, may determine the quantities of the optimum candidate food/flavor additive. Flavor compound selection optimizer 140 may also include optimization adjustment objectives, in the angle distance model described above in equation (1), as functions that act upon one or more of the candidate food/flavor additive's characteristics, such as candidate food/flavor additive cost and candidate food/flavor additive availability. Adjustment objective functions may be pre-set or may be configured. In certain embodiments, there may be an adjustment objective function for each flavor compound characteristic and, in various embodiments, the adjustment objective function for a single flavor compound characteristic may differ between flavor enhancement, flavor balance and flavor emulation.

The adjustment objective function is represented as "λ" in equations (5), (6), and (7) below. The flavor compound characteristic, or regularization term, acted upon by "λ" is represented by J in equations (5), (6) and (7) below. In various embodiments, the possible range of the angle distance between two descriptor vectors is [0, π].

For a received request to enhance a target food, flavor compound selection optimizer 140 may optimize the selection of a candidate food/flavor additive or combination of candidate food/flavor additives, from among the plurality of flavor compounds in the candidate repository 174, by using optimization algorithms, such as exhaustive search, combinatorial optimization, gradient methods and stochastic optimization, to solve for a candidate food/flavor additive or combination of candidate food/flavor additives whose physicochemical descriptors, when added to the physicochemical descriptors of the target food will create the most perceptually similar flavor to the target food.

Flavor compound selection optimizer 140 may, in various embodiments, also consider adjustment objectives when optimizing the selection of a candidate food/flavor additive or combination of candidate food/flavor additives, in order to identify the optimum candidate food/flavor additive that also meets one or more adjustment objectives, such as a cost objective or a low-fat objective. In equation (5) below, "a" is a flavor compound quantity vector for a candidate food/flavor additive, "h" is a flavor compound quantity vector for the target food, both "a" and "h" are elements in the set of positive real numbers and "a" will not equal "h" in order to select a flavor compound to enhance the target food that is not the same food or the same flavor compound in the target food.

To enhance the received target food, flavor compound selection optimizer 140 may optimize the selection of a candidate food/flavor additive or combination of candidate food/flavor additives, by solving optimization equation (5) below.

$$\min_{a, \|a\|=1, a \neq h} \theta(P(a + h), P(h)) + \lambda J(a) \qquad (5)$$

The smaller the angle, θ, between the descriptor vectors for the enhanced target food "P(a+h)" and the target food "P(h)", the more similar the perceptual flavor. The smaller the combined value of the adjustment objective function added to the angle between the descriptor vectors, the more optimum the identified candidate food/flavor additive or combination of candidate food/flavor additives.

To balance a target food, flavor compound selection optimizer 140 may optimize the selection of a candidate food/flavor additive or combination of candidate food/flavor additives from among the plurality of flavor compounds in the candidate repository 174, by using optimization algorithms, such as exhaustive search, combinatorial optimization, gradient methods and stochastic optimization, to solve for a candidate food/flavor additive or combination of candidate food/flavor additives whose physicochemical descriptors, when added to the physicochemical descriptors of the target food will create the most perceptually dissimilar flavor from the target food.

Flavor compound selection optimizer 140 may, in various embodiments, also consider adjustment objectives when optimizing the selection of a candidate food/flavor additive or combination of candidate food/flavor additives, in order to identify the optimum candidate food/flavor additive that also meets one or more adjustment objectives, such as a cost objective or a low-fat objective. In equation (6) below, "a" is a flavor compound quantity vector for a candidate food/flavor additive, "h" is a flavor compound quantity vector for the target food, and both "a" and "h" are elements in the set of positive real numbers.

To balance the received target food, flavor compound selection optimizer 140 may optimize the selection of a candidate food/flavor additive or combination of candidate food/flavor additives by solving optimization equation (6) below.

$$\max_{a, \|a\|=1} \theta(P(a + h), P(h)) + \lambda J(a) \qquad (6)$$

The larger the angle, θ, between the descriptor vector for the balanced target food "P(a+h)" and the target food "P(h)", the more dissimilar the perceptual flavor. The larger the combined value of the adjustment objective function added to the angle between the descriptor vectors, the more optimum the identified candidate food/flavor additive or combination of candidate food/flavor additives.

To emulate a target food, for example to substitute ingredients, flavor compound selection optimizer 140 may optimize the selection of a candidate food/flavor additive or combination of candidate food/flavor additives from among the plurality of flavor compounds in the candidate repository 174, by using optimization algorithms, such as exhaustive search, combinatorial optimization, gradient methods and stochastic optimization, to solve for a candidate food/flavor additive or combination of candidate food/flavor additives whose physicochemical descriptors create the most perceptually similar flavor to the target food.

Flavor compound selection optimizer 140 may, in various embodiments, also consider adjustment objectives when optimizing the selection of a candidate food/flavor additive or combination of candidate food/flavor additives in order to identify the optimum candidate food/flavor additive that also meets one or more adjustment objectives, such as a cost objective or a low-fat objective. In equation (7) below, "a" is a flavor compound quantity vector for a candidate food/flavor additive, "h" is a flavor compound quantity vector for the target food, both "a" and "h" are elements in the set of positive real numbers, and "a" will not equal "h" in order to select a flavor compound to emulate the target food that is not the same food or the same flavor compound in the target food.

To emulate the received target food, flavor compound selection optimizer 140 may optimize the selection of a candidate food/flavor additive or combination of candidate food/flavor additives by solving optimization equation (7) below.

$$\min_{a, \|a\|=1, a \neq h} \theta(P(a), P(h)) + \lambda J(a) \qquad (7)$$

The smaller the angle, θ, between the descriptor vector for the candidate food/flavor additive "P(a)" and the target food "P(h)", the more similar the perceptual flavor. The smaller the combined value of the adjustment objective function added to the angle between the descriptor vectors, the more optimum the candidate food/flavor additive or combination of candidate food/flavor additives. Flavor compound selection optimizer 140 may return the identified optimum candidate food/flavor compound additive to the requestor, to be used by the cook, chef, or factory to optimally enhance, balance or emulate the flavor of the input target food.

Similar to flavor compound selection optimizer 140, flavor compound generation optimizer 150, may optimize the identification of a combination of one or more flavor compounds, that, when mixed together, create a flavor additive that meets the requested perceptual similarity objectives of enhancement, balance, or emulation. As described above, the optimization formulas, shown in equations (5), (6) and (7), may be solved with any optimization algorithm, such as exhaustive search, combinatorial optimization, gradient methods and stochastic optimization.

For flavor compound generation optimizer 150, "a" in equations (5), (6), and (7) above is a flavor compound quantity vector for the desired flavor additive, "h" continues to be a flavor compound quantity vector for the target food, and both "a" and "h" are elements in the set of positive real numbers. Flavor compound generation optimizer 150 may, in various embodiments, also consider adjustment objectives when optimizing the creation of a flavor additive, in order to identify the optimum flavor additive that also meets one or more adjustment objectives, such as a cost objective or a low-fat objective.

In various embodiments, flavor compound generation optimizer 150 may add the newly created flavor additive to the candidate repository 174 or flavor compound repository 170 along with the quantity of each flavor compound required to create the optimum flavor additive. Flavor compound generation optimizer 150 may store characteristics of the newly created flavor additive, such as cost and availability values in flavor compound characteristics repository 176. In certain embodiments, only food additives, not food ingredients, may be considered for food additive creation.

Flavor compound generation optimizer 150 may return the created optimum flavor additive, along with a list of flavor compounds and flavor compound quantities that make up the created flavor additive to the requestor, to be used by the cook, chef, or factory to optimally mix and produce the flavor additive.

Computing device 122 represents a computing device, system or environment, and may be a laptop computer, notebook computer, personal computer (PC), desktop computer, tablet computer, thin client, mobile phone or any other electronic device or computing system capable of performing the required functionality of embodiments of the disclosure. Computing device 122 may include internal and external hardware components, as depicted and described in further detail with respect to FIG. 5. In other various embodiments of the present disclosure, computing device 122 may represent a computing system utilizing clustered computers and components to act as a single pool of seamless resources. In general, computing device 122 is representative of any programmable electronic devices or combination of programmable electronic devices capable of executing machine-readable program instructions in accordance with an embodiment of the disclosure.

Figure 3:
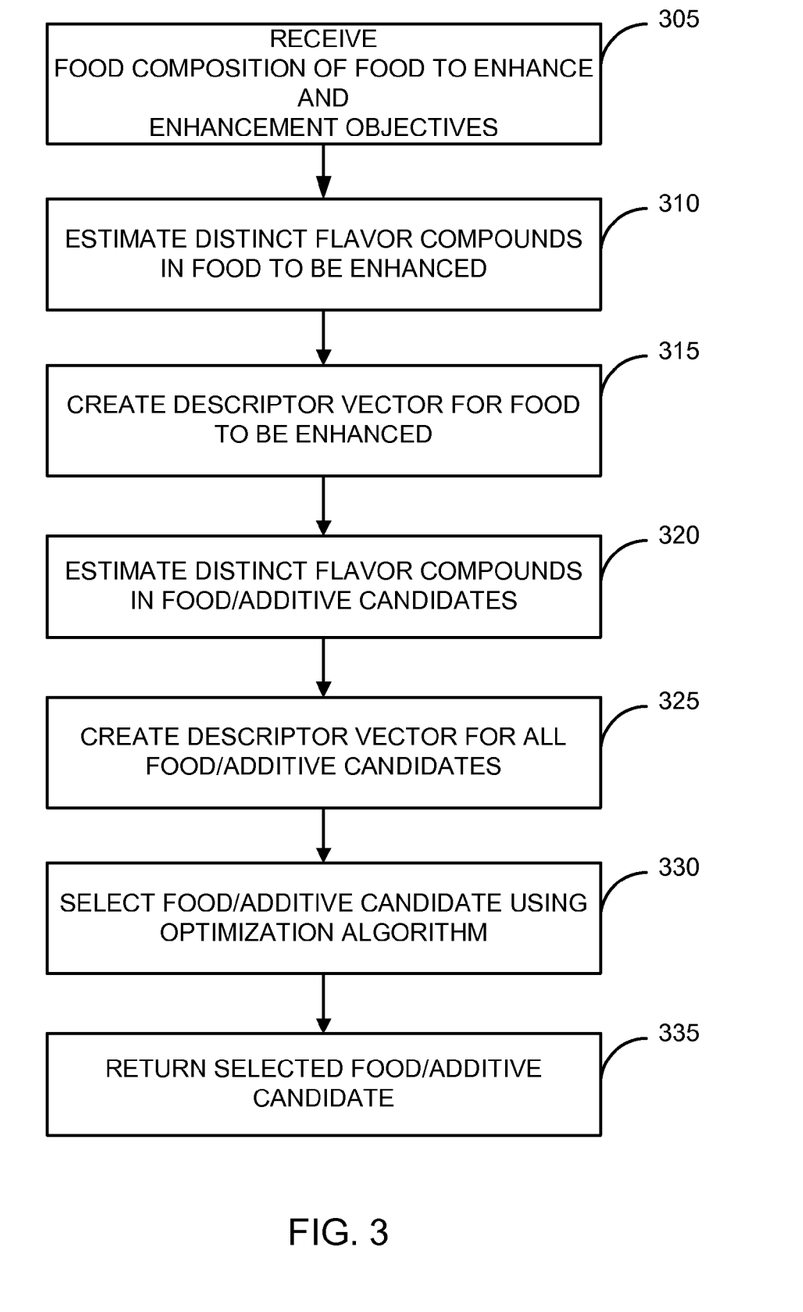
FIG. 3 is a flowchart illustrating the selection of a food/flavor additive, in accordance with an embodiment of the disclosure.

FIG. 3 is a flowchart illustrating the selection of a food/flavor additive, in accordance with an embodiment of the disclosure, to optimally enhance a food. In various embodiments, distinct flavor compound adjuster 120 may receive, at 305, a list of flavor compounds and quantities of those flavor compounds in a food to be enhanced, along with an enhancement objective. The received list of flavor compounds and quantities of those flavor compounds for the food to be enhanced may be determined from the recipe repository 172 or by analyzing a food sample with an electronic nose. In various embodiments, the intensity of each flavor compound may also be received. The received objective may be to enhance the flavor of the food, balance the flavor of the food, or substitute ingredients in the food without modifying the flavor of the food. The substitutions may be, for example to lower the cost of the food or remove allergy producing ingredients.

Distinct flavor compound adjuster 120 may, at 310, select a subset of the list of received flavor compounds which distinctly flavor the food to be enhanced. Flavor compounds commonly found in foods, such as salt, may not be selected as distinct flavor compounds. Descriptor vector calculator 130 may use the distinct subset of flavor compounds selected by distinct flavor compound adjuster 120 to create, at 315, a physicochemical descriptor vector for the food to be enhanced. The physicochemical descriptor vector for the food may be created from the physicochemical properties of each of the distinct flavor compounds in the food, the quantity of each distinct flavor compound in the food, and in certain embodiments, the intensity of each distinct flavor compound in the food.

After the physicochemical descriptor vector for the food to be enhanced is created, physicochemical descriptor vectors of candidate food/flavor additives may also be created. In various embodiments, candidate food/flavor additives may be all known foods and flavor additives in the flavor compound repository 170. In certain embodiments, candidate food/flavor additives may be a subset of the known flavor compounds in the flavor compound repository 170 that meet, for example, certain cost, availability, or dietary requirements. In certain other embodiments, flavor compound sensor 110 may analyze a candidate food/flavor additive with an electronic nose to estimate the candidate food/flavor additive's flavor compounds. In various embodiments, flavor compound sensor 110 may also determine the intensity of each flavor compound in the candidate food/flavor additive.

Distinct flavor compound adjuster 120 may, at 320, select the subset of the flavor compounds in all candidate food/flavor additives which distinctly flavor the candidate food/flavor additive. Descriptor vector calculator 130, may use the distinct subset of flavor compounds of each candidate food/flavor additive to create, at 325, a physicochemical descriptor vector for each candidate food/flavor additive. Each physicochemical descriptor vector for the candidate food/flavor additive may be created from the physicochemical properties of each of the distinct flavor compounds in the candidate food/flavor additive, the quantity of each distinct flavor compound in the candidate food/flavor additive, and in certain embodiments, the intensity of each distinct flavor compound in the candidate food/flavor additive.

Flavor compound selection optimizer 140 may, at 330, select the optimum candidate food/flavor additive to enhance the food using an optimization algorithm that compares the angle between the physicochemical descriptor vector for the food to be enhanced and the plurality of candidate food/flavor additive physicochemical descriptor vectors. Flavor compound selection optimizer 140 may, at 335, return the selected optimum candidate food/flavor additive.

Figure 4:
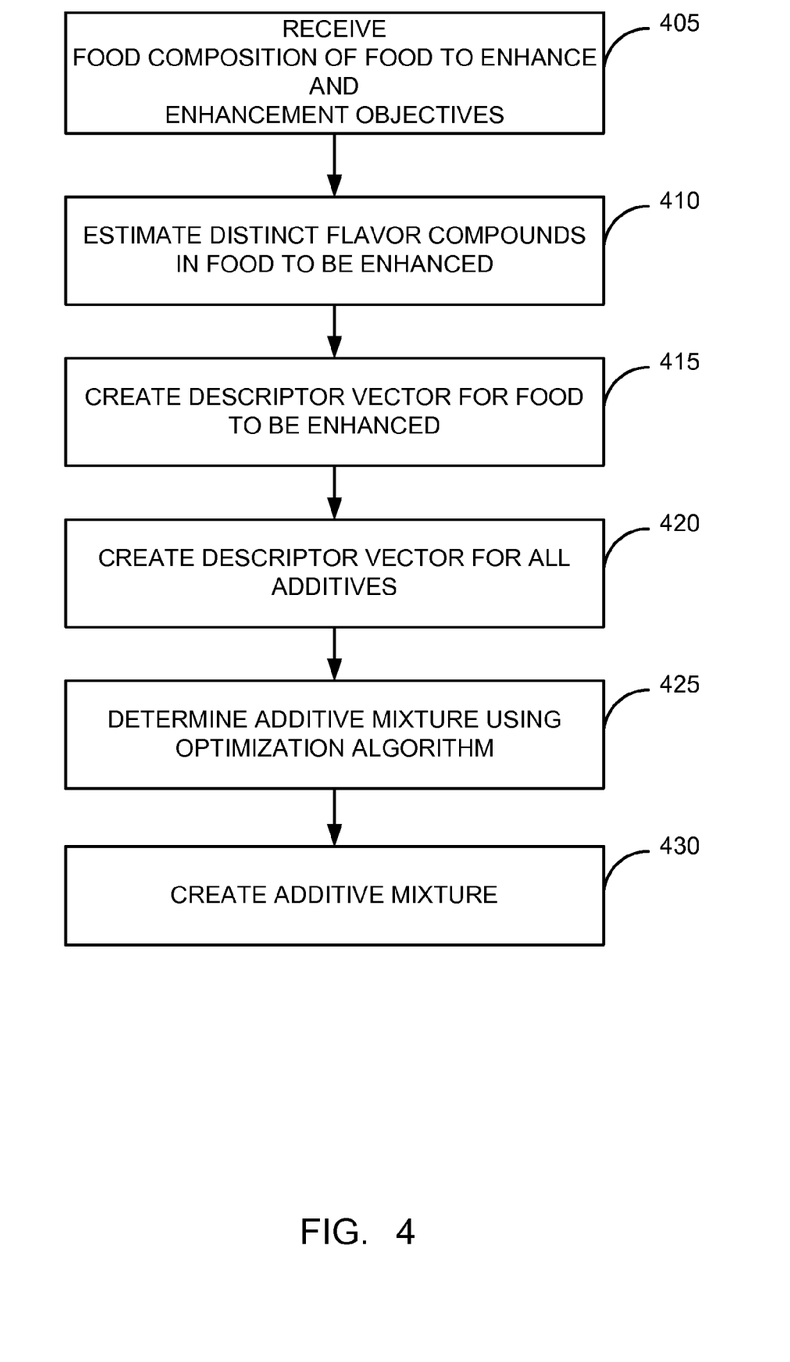
FIG. 4 is a flowchart illustrating the creation of a flavor additive mixture, in accordance with an embodiment of the disclosure.

FIG. 4 is a flowchart illustrating the creation of a flavor additive mixture, in accordance with an embodiment of the disclosure. In various embodiments, distinct flavor compound adjuster 120 may receive, at 405, a list of flavor compounds and quantities of those flavor compounds in a food to be enhanced, along with an enhancement objective. The received list of flavor compounds and quantities of those flavor compounds for the food to be enhanced may be determined from the recipe repository 172 or by analyzing a food sample with an electronic nose. In various embodiments, the intensity of each flavor compound may also be received. The received objective may be to enhance the flavor of the food, balance the flavor of the food, or emulate the flavor of the food.

Distinct flavor compound adjuster 120 may, at 410, select a subset of the list of received flavor compounds which distinctly flavor the food to be enhanced. Flavor compounds commonly found in foods, such as salt, may not be selected as distinct flavor compounds. Descriptor vector calculator 130 may use the distinct subset of flavor compounds selected by distinct flavor compound adjuster 120 to create, at 415, a physicochemical descriptor vector for the food to be enhanced. The physicochemical descriptor vector for the food may be created from the physicochemical properties of each of the distinct flavor compounds in the food, the quantity of each distinct flavor compound in the food, and in certain embodiments, the intensity of each distinct flavor compound in the food.

After the physicochemical descriptor vector for the food to be enhanced is created, physicochemical descriptor vectors of candidate flavor additives may also be created. In various embodiments, candidate flavor additives may include all known flavor additives in the flavor compound repository 170. In certain embodiments, candidate flavor additives may be a subset of the known flavor compounds in the flavor compound repository 170 that meet, for example, certain cost, availability, or dietary requirements.

Descriptor vector calculator 130 may create, at 420, a physicochemical descriptor vector for each candidate flavor additive. Each physicochemical descriptor vector for the candidate flavor additive may be created from the physicochemical properties of each of the flavor compounds in the candidate flavor additive, the quantity of each flavor compound in the candidate flavor additive, and in certain embodiments, the intensity of each flavor compound in the candidate flavor additive.

Flavor compound generation optimizer 150 may, at 425, determine the optimum candidate flavor additive, which may be a mixture of candidate flavor additives, to enhance the food. Flavor compound generation optimizer 150 may use an optimization algorithm that compares the angle between the physicochemical descriptor vector for the food to be enhanced and the plurality of candidate flavor additive physicochemical descriptor vectors. Flavor compound generation optimizer 150 may, at 430, create the determined optimum flavor additive and store the details of the created flavor additive in the flavor compound repository 170 or the flavor compound candidate repository 174, including a list of flavor compounds in the flavor additive and quantities of each flavor compound in the flavor additive. In various embodiments, flavor compound generation optimizer 150, may store the characteristics of the flavor additive, such as cost, intensity, and availability of the created flavor additive in the characteristics repository 176.

Figure 5:
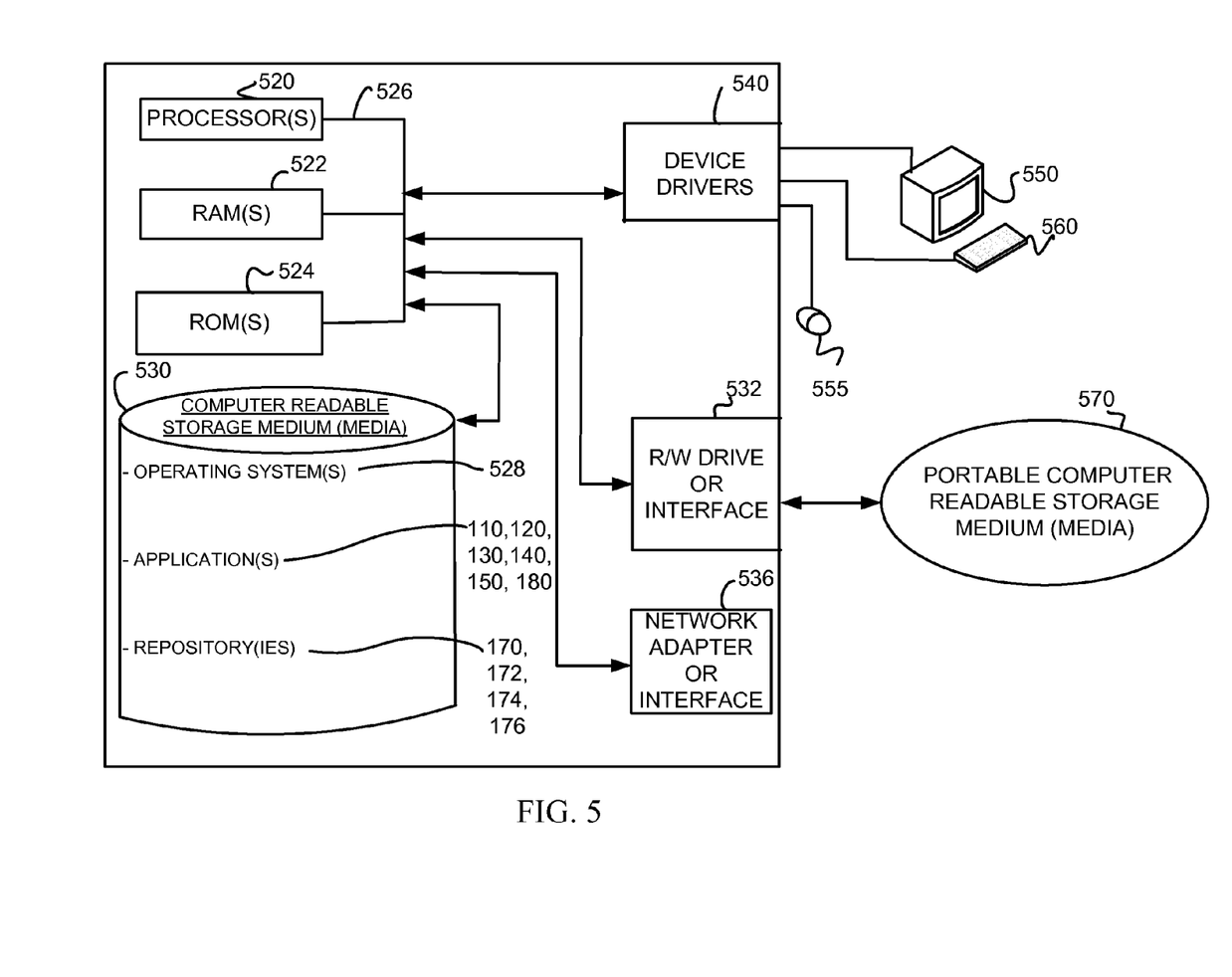
FIG. 5 depicts a block diagram of components of a computing device, in accordance with an embodiment of the disclosure.

FIG. 5 depicts a block diagram of components of computing device 122 of FIG. 1, in accordance with an embodiment of the disclosure. It should be appreciated that FIG. 5 provides only an illustration of one implementation and does not imply any limitations with regard to the environments in which different embodiments may be implemented. Many modifications to the depicted environment may be made.

Computing device 122 can include one or more processors 520, one or more computer-readable RAMs 522, one or more computer-readable ROMs 524, one or more computer readable storage medium 530, device drivers 540, read/write drive or interface 532, and network adapter or interface 536, all interconnected over a communications fabric 526. Communications fabric 526 can be implemented with any architecture designed for passing data and/or control information between processors (such as microprocessors, communications and network processors, etc.), system memory, peripheral devices, and any other hardware components within a system.

One or more operating systems 528, applications: flavor compound sensors 110, distinct flavor compound adjusters 120, descriptor vector calculators 130, flavor compound selection optimizers 140, flavor compound generation optimizers 150, and target food compositions 180, and repositories: flavor compound repositories 170, recipe repositories 172, flavor compound candidate repositories 174, and flavor compound characteristics repositories 176 are stored on one or more of the computer-readable storage medium 530 for execution by one or more of the processors 520 via one or more of the respective RAMs 522 (which typically include cache memory). In the illustrated embodiment, each of the computer readable storage medium 530 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer readable storage medium that can store a computer program and digital information.

Computing device 122 can also include a R/W drive or interface 532 to read from and write to one or more portable computer readable storage medium 570. Flavor compound sensor 110, distinct flavor compound adjuster 120, descriptor vector calculator 130, flavor compound selection optimizer 140, flavor compound generation optimizer 150, target food composition 180, flavor compound repository 170, recipe repository 172, flavor compound candidate repository 174, and flavor compound characteristics repository 176 can be stored on one or more of the portable computer readable storage medium 570, read via the respective R/W drive or interface 532, and loaded into the respective computer readable storage medium 530.

Computing device 122 can also include a network adapter or interface 536, such as a TCP/IP adapter card or wireless communication adapter (such as a 4G wireless communication adapter using OFDMA technology). Flavor compound sensor 110, distinct flavor compound adjuster 120, descriptor vector calculator 130, flavor compound selection optimizer 140, flavor compound generation optimizer 150, target food composition 180, flavor compound repository 170, recipe repository 172, flavor compound candidate repository 174, and flavor compound characteristics repository 176 can be downloaded to the computing device from an external computer or external storage device via a network (for example, the Internet, a local area network or other, wide area network or wireless network) and network adapter or interface 536. From the network adapter or interface 536, the programs are loaded into the computer readable storage medium 530. The network may comprise copper wires, optical fibers, wireless transmission, routers, firewalls, switches, gateway computers, and/or edge servers.

Computing device 122 can also include a display screen 550, a keyboard or keypad 560, and a computer mouse or touchpad 555. Device drivers 540 interface to display screen 550 for imaging, to keyboard or keypad 560, to computer mouse or touchpad 555, and/or to display screen 550 for pressure sensing of alphanumeric character entry and user selections. The device drivers 540, R/W drive or interface 532, and network adapter or interface 536 can comprise hardware and software (stored in computer readable storage medium 530 and/or ROM 524).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. A method comprising:
   receiving, by a computer, data identifying one or more flavor compounds and their respective quantities in a food and an enhancement objective;
   identifying, by the computer, one or more flavor compounds associated with a distinct flavor of the food;
   creating, by the computer, a vector of physicochemical properties associated with the one or more flavor compounds associated with the distinct flavor of the food;
   creating, by the computer, a vector of physicochemical properties associated with each of one or more additive flavor compounds; and
   identifying, by the computer, an additive flavor compound to enhance the food based on the angle between the physicochemical property vector associated with the distinct flavor of the food and the physicochemical property vectors for the one or more additive flavor compounds, and the enhancement objective.

2. The method according to claim 1, wherein creating a vector of physicochemical properties associated with each of one or more additive flavor compounds further comprises selecting the additive flavor compounds based on the enhancement objective.

3. The method according to claim 1, wherein identifying an additive flavor compound to enhance the food comprises one of:
   selecting, by the computer, an additive flavor compound from the one or more additive flavor compounds to enhance the food based on the angle between the physicochemical property vector associated with the distinct flavor of the food and the physicochemical property vectors for the one or more additive flavor compounds, and the enhancement objective; or
   creating, by the computer, an additive flavor compound to enhance the food based on the angle between the physicochemical property vector associated with the distinct flavor of the food and the physicochemical property vectors for the one or more additive flavor compounds, and the enhancement objective.

4. The method according to claim 1, wherein the enhancement objective includes one or more of: enhancement of food flavor, balance of food flavor, emulation of a food flavor, ingredient cost, ingredient availability, food production cost, dietary requirements, and calorie requirements.

5. The method according to claim 1, wherein the vector of physicochemical properties associated with the one or more flavor compounds associated with the distinct flavor of the food includes vector components wherein each vector component is associated with a flavor compound, and wherein each component value is based in part on an intensity value and a quantity value associated with the flavor compound.

6. The method according to claim 1, wherein identifying an additive flavor compound to enhance the food includes an adjustment function.

7. The method according to claim 1, wherein additive flavor compounds comprise a mixture of one or more individual flavor compounds.

8. A computer program product, the computer program product comprising one or more computer readable storage medium and program instructions stored on at least one of the one or more computer readable storage medium, the program instructions comprising:
   program instructions to receive, by a computer, data identifying one or more flavor compounds and their respective quantities in a food and an enhancement objective;
   program instructions to identify, by the computer, one or more flavor compounds associated with a distinct flavor of the food;
   program instructions to create, by the computer, a vector of physicochemical properties associated with the one or more flavor compounds associated with the distinct flavor of the food;
   program instructions to create, by the computer, a vector of physicochemical properties associated with each of one or more additive flavor compounds; and
   program instructions to identify, by the computer, an additive flavor compound to enhance the food based on the angle between the physicochemical property vector associated with the distinct flavor of the food and the physicochemical property vectors for the one or more additive flavor compounds, and the enhancement objective.

9. The computer program product according to claim 8, wherein program instruction to create a vector of physicochemical properties associated with each of one or more additive flavor compounds further comprises program instructions to select the additive flavor compounds based on the enhancement objective.

10. The computer program product according to claim 8, wherein program instruction to identify an additive flavor compound to enhance the food comprises one of:
    program instructions to select, by the computer, an additive flavor compound from the one or more additive flavor compounds to enhance the food based on the angle between the physicochemical property vector associated with the distinct flavor of the food and the physicochemical property vectors for the one or more additive flavor compounds, and the enhancement objective; or
    program instructions to create, by the computer, an additive flavor compound to enhance the food based on the angle between the physicochemical property vector associated with the distinct flavor of the food and the physicochemical property vectors for the one or more additive flavor compounds, and the enhancement objective.

11. The computer program product according to claim 8, wherein the enhancement objective includes one or more of: enhancement of food flavor, balance of food flavor, emulation of a food flavor, ingredient cost, ingredient availability, food production cost, dietary requirements, and calorie requirements.

12. The computer program product according to claim 8, wherein the vector of physicochemical properties associated with the one or more flavor compounds associated with the distinct flavor of the food includes vector components wherein each vector component is associated with a flavor compound, and wherein each component value is based in part on an intensity value and a quantity value associated with the flavor compound.

13. The computer program product according to claim 8, wherein program instructions to identify an additive flavor compound to enhance the food includes an adjustment function.

14. The computer program according to claim 8, wherein additive flavor compounds comprise a mixture of one or more individual flavor compounds.

15. A computer system, the computer system comprising one or more processors, one or more computer readable memories, one or more computer readable tangible storage medium, and program instructions stored on at least one of the one or more storage medium for execution by at least one of the one or more processors via at least one of the one or more memories, the program instructions comprising:
- program instructions to receive, by a computer, data identifying one or more flavor compounds and their respective quantities in a food and an enhancement objective;
- program instructions to identify, by the computer, one or more flavor compounds associated with a distinct flavor of the food;
- program instructions to create, by the computer, a vector of physicochemical properties associated with the one or more flavor compounds associated with the distinct flavor of the food;
- program instructions to create, by the computer, a vector of physicochemical properties associated with each of one or more additive flavor compounds; and
- program instructions to identify, by the computer, an additive flavor compound to enhance the food based on the angle between the physicochemical property vector associated with the distinct flavor of the food and the physicochemical property vectors for the one or more additive flavor compounds, and the enhancement objective.

16. The computer system according to claim 15, wherein program instruction to create a vector of physicochemical properties associated with each of one or more additive flavor compounds further comprises program instructions to select the additive flavor compounds based on the enhancement objective.

17. The computer system according to claim 15, wherein program instruction to identify an additive flavor compound to enhance the food comprises one of:
- program instructions to select, by the computer, an additive flavor compound from the one or more additive flavor compounds to enhance the food based on the angle between the physicochemical property vector associated with the distinct flavor of the food and the physicochemical property vectors for the one or more additive flavor compounds, and the enhancement objective; or
- program instructions to create, by the computer, an additive flavor compound to enhance the food based on the angle between the physicochemical property vector associated with the distinct flavor of the food and the physicochemical property vectors for the one or more additive flavor compounds, and the enhancement objective.

18. The computer system according to claim 15, wherein the enhancement objective includes one or more of: enhancement of food flavor, balance of food flavor, emulation of a food flavor, ingredient cost, ingredient availability, food production cost, dietary requirements, and calorie requirements.

19. The computer system according to claim 15, wherein the vector of physicochemical properties associated with the one or more flavor compounds associated with the distinct flavor of the food includes vector components wherein each vector component is associated with a flavor compound, and wherein each component value is based in part on an intensity value and a quantity value associated with the flavor compound.

20. The computer system according to claim 15, wherein program instructions to identify an additive flavor compound to enhance the food includes an adjustment function.

* * * * *